May 11, 1954  J. F. MAZZA  2,678,234
DUMP TRUCK
Filed Sept. 12, 1951 4 Sheets-Sheet 1
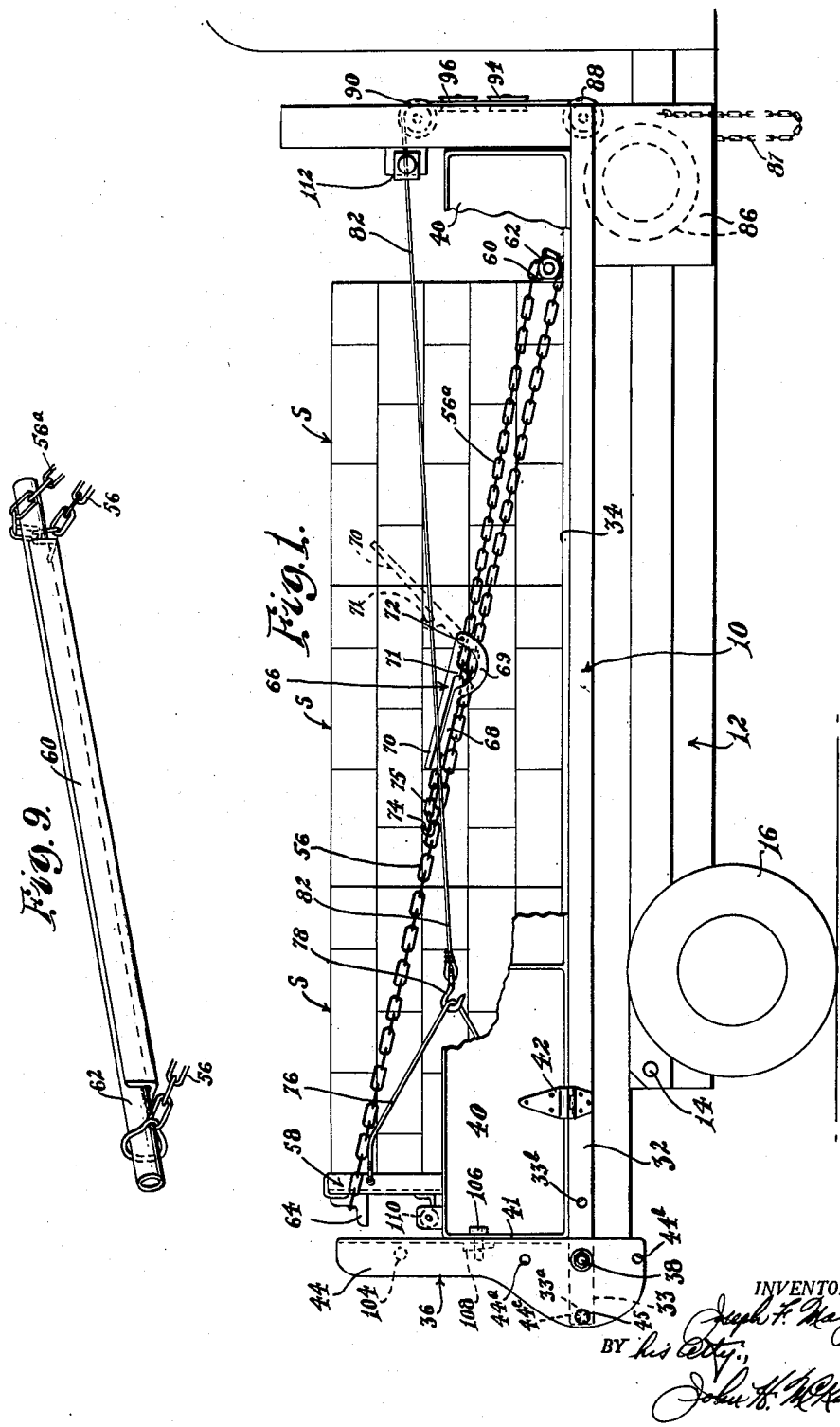
INVENTOR.
Joseph F. Mazza
BY his Atty.,
John H. McKenna May 11, 1954   J. F. MAZZA   2,678,234
DUMP TRUCK
Filed Sept. 12, 1951   4 Sheets-Sheet 2
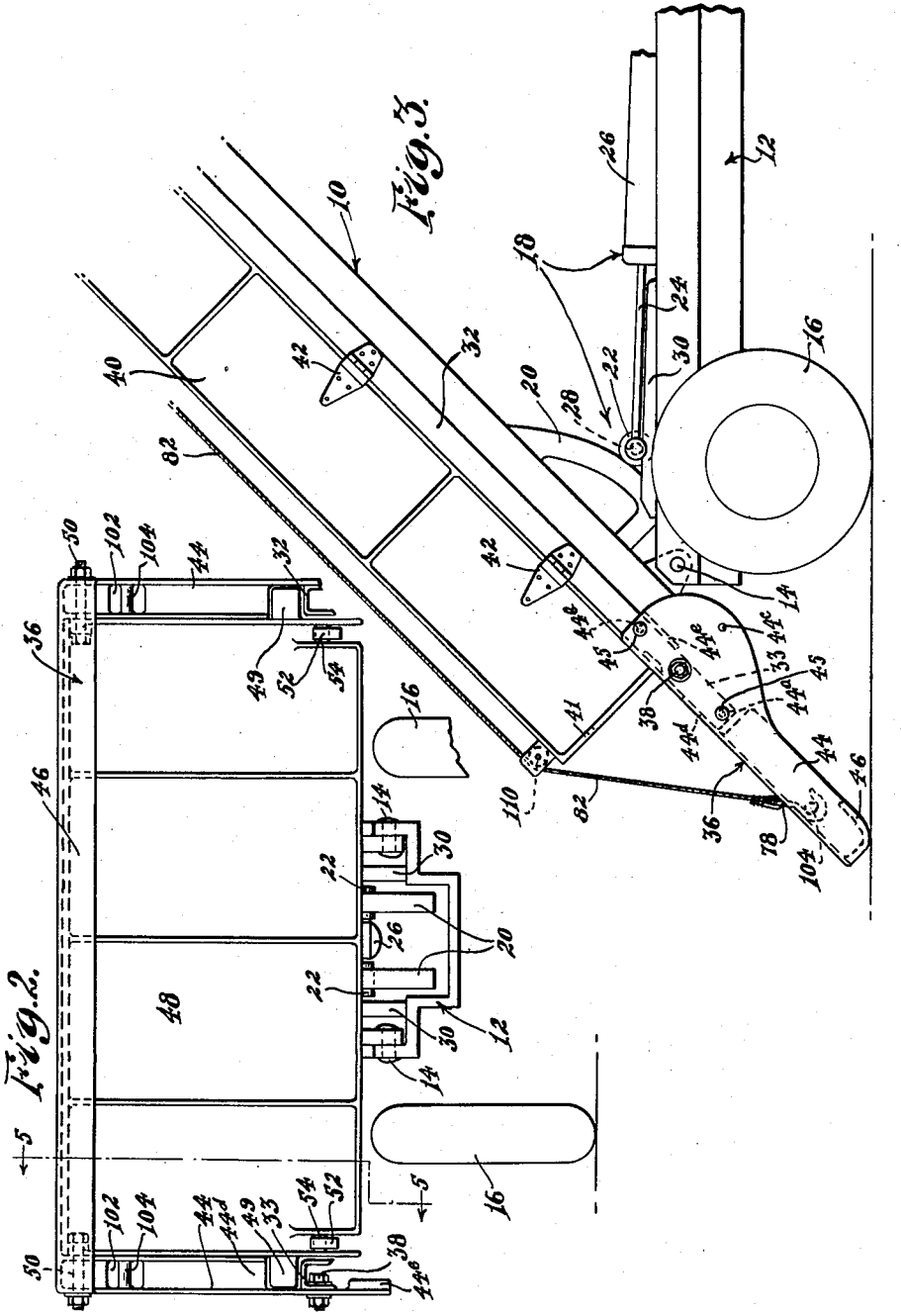
INVENTOR.
Joseph F. Mazza
BY his Atty.,
John H. McKenna

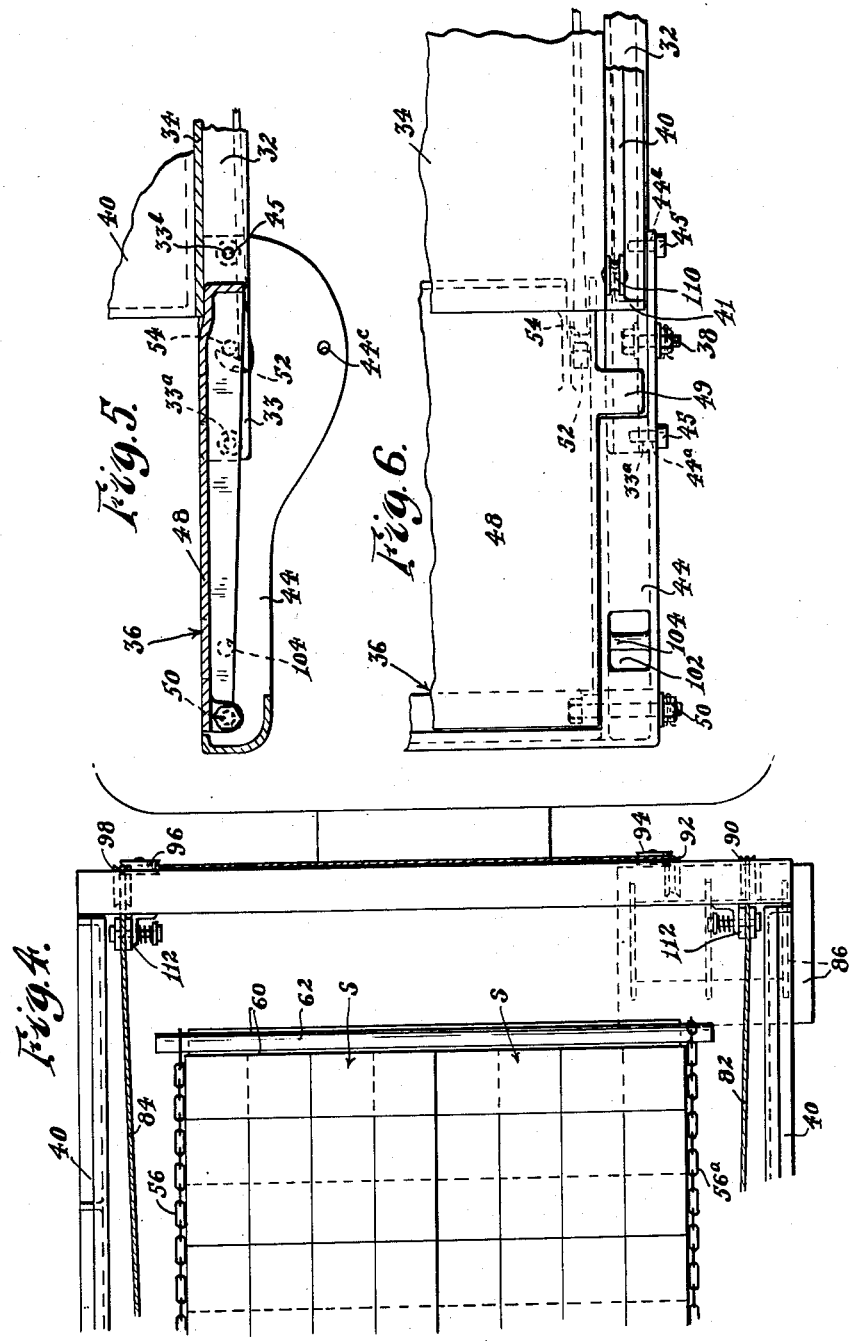

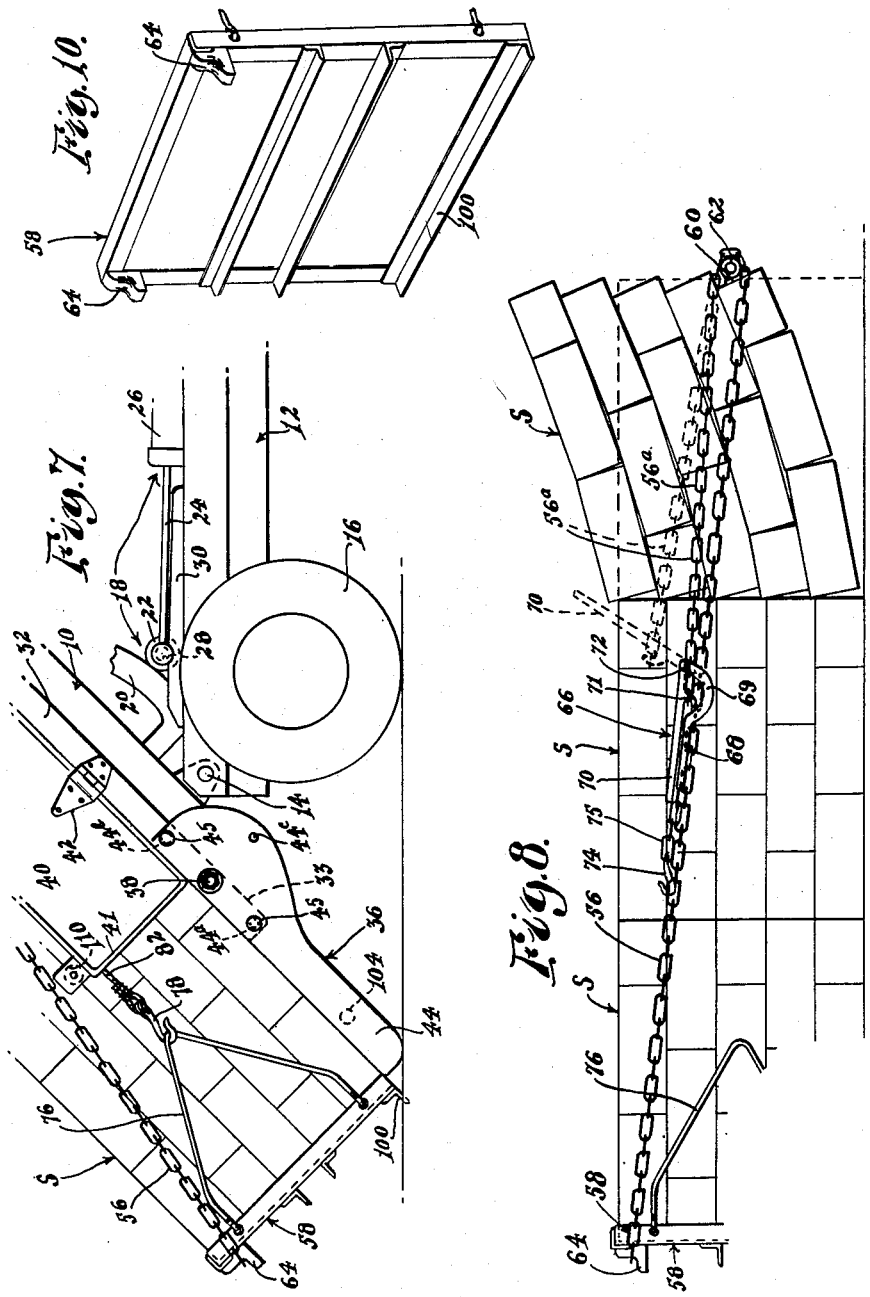

Patented May 11, 1954

2,678,234

UNITED STATES PATENT OFFICE 2,678,234

DUMP TRUCK

Joseph F. Mazza, Belmont, Mass.

Application September 12, 1951, Serial No. 246,195

2 Claims. (Cl. 298—17)

1

This invention relates to improvements in automotive trucks of the general types employed for hauling sand and gravel, bricks, building blocks, and the like, wherein the bodies are pivotally mounted on the vehicle chassis, toward the rear end thereof, with power means for tilting or hoisting the bodies about their pivotal axes when their loads are to be dumped. More particularly, the invention provides an improved truck which may be used in a conventional manner, for hauling sand, gravel, cinders, coal, and the like, but which has structural features which make it especially suitable for hauling building blocks, such as cinder blocks, for example, which may be compactly stacked in the truck, and be relatively quickly slid off at a desired destination with the blocks becoming deposited generally in the stacked relation they had in the truck.

Heretofore, building blocks and the like usually have been hauled either in conventional trucks which dump their loads with the blocks promiscuously piled and spread out over a considerable area, or in especially designed trucks which are intended to deposit stacked loads of blocks in the trucks in correspondingly stacked piles on the ground at desired destinations. When conventional dump trucks have been used, the blocks ordinarily are stacked on the trucks and, at a desired destination, two or more men tediously transfer the blocks from the truck and stack them on the ground. This consumes a considerable amount of time during which the truck and the two or more men are occupied. If the load is dumped from a conventional truck, by hoisting its body, the blocks become strewn around in an unsightly spread-out pile, and a substantial number of the blocks may become broken or chipped.

The prior specially designed trucks for hauling and dumping building blocks, and the like, have been wholly unsuitable for general hauling purposes, such as for hauling sand, cinders, and the like. Hence, the prior specially designed trucks, when not in use for hauling building blocks, etc., stand idle. Also, such trucks, having delivered a load of blocks, must return empty because they are incapable of taking on a load of sand or cinders, etc., for the return trip.

It is among the objects of my present invention to provide a hauling truck which may be used as a conventional dump truck for hauling sand, cinders, coal, and the like, and which has structural features whereby the same truck is especially adapted for hauling stacked loads of building blocks, and the like, which may be relatively quickly slid from the truck at desired destinations

2 with the blocks deposited substantially in the stacked relationships they had in the trucks. According to the invention, a truck body has a conventional type of floor or bottom and is pivotally mounted at the rear end of a chassis with the pivot located rearward of but close to the vertical plane of the rear axle of the truck, whereby the truck body may be tilted or hoisted about its pivot in the dumping process. A tailboard is pivotally mounted for movements between a position closing the rear end of the truck body, and a position in which it constitutes a strut-extension of the floor of the truck body when the body is hoisted to an inclination to bring the tail-board into engagement with the ground. In the body-closing position of the tailboard, a dump-door in the tail-board is operable to permit a load of sand, cinders, or the like, to be dumped therethrough, in a conventional manner. In the lowered strut-extension position of the tail-board, a stacked load of blocks in the hoisted truck body may be gradually lowered along the inclined floor of the body and along the tail-board extension thereof, with the load supported in substantial part by the rear axle of the truck and, in substantial part by the tail-board which acts as a strut preventing lifting of the front end of the truck even though the load may several times exceed the weight of the forward portion of the truck.

Another object of the invention is to provide a hauling dump truck having a tail-board designed to constitute a strut-extension of the floor of the truck body when the truck body is hoisted in the dumping process, and having means for holding a stacked load of blocks, or the like, in the truck against any appreciable slippage during the process of hoisting the truck body to its dumping inclination, with provision for controlled release of the load for gradual movement down the dumping incline into engagement with the ground, there being quick-releasing mechanism tying the stacked load together during its descent and during the deposition of the stacked load on the ground as the truck moves out from under the load.

A further object of the invention is to provide a hauling dump truck having a tail-board designed to constitute a strut-extension of the floor of the truck body when the truck body is hoisted in the dumping process, and having means for holding a stacked load of blocks, or the like, in the truck body during the hoisting process and adapted for controlled lowering of the load along the inclined floor of the body and along its tailboard extension, said holding means including an element for digging into the ground as the leading end of the load engages the ground, whereby said element constitutes a pivot about which the inclined load swings and becomes deposited on the ground as the truck moves forward out from under the load.

It is, moreover, my purpose and object generally to improve the structure of automotive dump trucks and procedures for handling stacked loads of blocks, and the like, in such trucks, and more especially such trucks and procedures which permit and promote unloading of stacked loads of building blocks, and the like, with deposition of the blocks substantially in the stacked relationships they had in the truck.

In the accompanying drawings:

Fig. 1 is a side elevation of a truck embodying features of the invention, portions of the rear side-board of the truck body being broken away to show how separate stacks of building blocks, or the like, may be tied together within the truck body by quick-releasing means embodying features of the invention;

Fig. 2 is a rear elevation of the loaded truck of Fig. 1;

Fig. 3 is a side elevation of the truck of Fig. 1 with its body hoisted and with its tail-board in its position constituting a strut-extension of the floor of the truck body, the load of blocks being omitted in Fig. 3;

Fig. 4 is a top plan view of the forward end of the truck body, and the load of blocks therein, showing the load holding and controlling means;

Fig. 5 is a fragmentary cross-sectional view on line 5—5 of Fig. 3, on a larger scale, but with the tail-board in its lowered position;

Fig. 6 is a top plan view of one side marginal portion of the tail-board as shown in Fig. 5;

Fig. 7 is a side elevation of the rear end portion of the truck showing the load after being lowered to bring its leading edge into engagement with the ground;

Fig. 8 is a side elevation of the tied-together load in its condition as deposited on the ground, the illustrated relations of the tied-together blocks being more or less diagrammatic;

Fig. 9 is a perspective view of the element to whose opposite ends the tie-chain is connected at the forward end of a load of tied-together block elements; and Fig. 10 is a perspective view of the frame which engages the rear end of the load of block elements.

Referring to the drawings, the invention is shown embodied in a truck whose body 10 is supported on the chassis 12 with pivotal connection at 14 to the rear end of the chassis whereby the body 10 may be tilted about the pivotal axis at 14 when it is desired to dump any load that may be within the body.

According to the invention, the chassis 12 has rearward extent beyond the axle at the rear wheels 16 substantially less than what has been conventional and usual, and the pivotal connection 14 is relatively close to the rear axle, with the body 10 projecting a substantial distance rearward beyond the chassis. A conventional hydraulic means is represented generally at 18 in Figs. 3 and 7 for tilting or hoisting the body to the forty-five degree dumping inclination shown in Figs. 2, 3 and 7, or to any greater or lesser inclination when desired. As shown, cam elements 20 on the under side of body 10 coact with rollers 22 at the end of a piston rod 24 whose piston (not shown) is operable within the cylinder 26 on chassis 12. The rollers 22 are on a shaft 28 whose opposite ends ride on fixed tracks 30 on the chassis. As this is a well known type of hydraulic truck-dumping or hoisting mechanism, no further description thereof is considered necessary.

The truck body 10 includes two rugged longitudinally extending angle or channel iron members 32, one at each side of the body, substantially in the plane of the floor 34 of the body. These members 32 project substantially beyond the rear end of body 10, as at 33, and a tail-board, indicated generally at 36, is pivotally supported at 38 on their projecting portions 33. Also, the side-boards 40 conveniently may be hinged as at 42 to these angle or channel iron members 32.

A feature of importance resides in the structure and manner of mounting of the tail-board 36, which can serve in a conventional manner when the truck is being used to transport sand, cinders, and the like, but which is operable to constitute a strut-extension of the floor 34 of the truck when a stacked load of building blocks, or the like, is to be slid from the truck and deposited with the blocks substantially in the stacked relationship they had in the truck.

Referring more particularly to Figs. 2, 5 and 6, the tail-board 36 comprises a rugged frame having side portions 44, 44 and a transverse rugged connecting shoe portion 46 which is adapted to engage and ride on the ground when the tail-board is serving in its capacity as a strut-extension of the floor 34 of the body 10. The pivot means at 38 extend through the side portions 44, 44 at opposite sides of the tail-board and through the adjacent extensions 33 of the angle or channel iron members 32, with the side portions 44, 44 preferably shaped to cover the extensions 33 in all positions of the tail-board, when viewed from either side of the truck. Each side portion 44 extends at the outer side of the adjacent extension 33 substantially beyond the pivot 38 and each portion 44 is provided with the three holes 44a, 44b and 44c of which the holes 44a, 44b are adapted to register with holes 33a, 33b in the adjacent extension 33 and angle or channel iron member 32 respectively when the tail-board is in its lowered position, and the hole 44c is adapted to register with the hole 33a in the adjacent extension 33 when the tail-board is in its elevated position. Any suitable pins 45 may be removably inserted through the registering holes to lock the tail-board in either of its said positions. Also, abutments 44d, 44e on each side portion 44 preferably engage the adjacent extension 33 and angle iron 32 on opposite sides of pivot 38 when the tail-board is in its lowered position thereby to increase the rigidity of the tail-board as a strut when tilted into engagement with the ground.

The main body of tail-board 36 is a rugged dump-door 48 pivotally mounted at 50 in the frame with its pivotal axis close to the shoe portion 46 and parallel thereto. The dump-door 48 ordinarily will be secured in closed relation to its supporting frame and the frame and dump-door 48 then constitute a rigid tail-board 36 which is operable about the pivotal axis 38 between its illustrated elevated and lowered positions. Any conventional means may be employed for securing the dump-door 48 in closed, rigid relation to its frame, such as the hooks 52 which engage lower portions of the dump-door at opposite side regions thereof. The hooks 52 may be operated manually into and out of door-securing engagement by conventional actuating mechanism (not shown) which customarily includes an operating lever exteriorly of the front end of the truck body. According to the invention, however, the hooks 52 are required to secure the dump-door 48 by engaging cross-sectionally round portions 54 thereon whose axes are required to be aligned with the pivotal axis 38 of the tail-board. By this means, the dump-door can be effectively held closed in its frame by the hooks 52 as the frame and dump-door unit swings about pivot 38, with the cross-sectionally round portions 54 rotating within the hooks. At times when the truck is being used for hauling sand, cinders, etc., with the tail-board 36 closing the rear end of the truck body 10, the dump-door 48 is available to facilitate dumping of the load in a conventional manner by manual operation of the securing hooks 52 to release the dump-door for outward swinging about its pivotal support at 50. The dump-door 48 may be provided with lateral projections for engaging and resting on the extensions 33 of the angle or channel iron members 32 when the tail-board is in its lowered position. Such projections are indicated at 49 in Figs. 2 and 6.

When the truck is to be used for hauling building blocks, or the like, the blocks may be compactly stacked in the truck as shown in Figs. 1 and 4. As represented, the load of blocks consists of six similar separate stacks S of blocks, and each separate stack may represent the load of a small power yard truck of conventional type by which each separate stack S may be picked up from a stacked supply of blocks and be placed on the floor of the truck body in a well known manner. The side-boards 40 will be lowered and the yard truck delivers three stacks in succession at one side of the truck and three in succession at the other side to make up the illustrated six-stack truck load.

According to the invention, the load of blocks in the truck is bound together by a chain 56, and an angle iron frame, indicated generally at 58, is arranged against the rear end of the load of blocks with the chain 56 passing around its upper end. At the lower front end of the load of blocks, an angle iron 60, with a long rigid pipe 62 secured thereto, extends transversely across the load of blocks in the region of the lower layer of blocks. Angle iron 60 rests against the blocks and pipe 62 projects beyond the load at each side. One end of chain 56 is secured to one projecting end of pipe 62 whence the chain passes diagonally rearwardly and upwardly to an upper rear corner region of the load and thence transversely across the upper end of frame 58 which, preferably, is equipped with elements 64 by which the chain is maintained at a predetermined elevation where it passes around the upper rear end of the load. However, the elements 64 have rounded surfaces of chain engagement whereby the chain can slip freely in transverse directions. The continuous length of chain 56, having been drawn across the upper end of frame 58, passes thence diagonally downwardly and forwardly and is secured to the other projecting end of pipe 62, with provision in this latter securement for leverage tensioning of the chain about the load and for leverage quick-release of the chain after the truck load of blocks has been deposited at a desired destination. As best seen in Figs. 1, 8 and 9, the chain is brought around the end of pipe 62 and backward along the load, as at 56a, to a tensioning and quick-releasing over-center releasing device indicated generally at 66. The device 66 may consist of two rigid bars 68, 70 pivotally connected together at 72, the bar 68 having the generally U-shape at 69 adjacent to pivot 72, and the bar 70 having a hook 71, or the like, formed thereon. The free end of bar 68 has a hook 74 permanently connected thereto, as by the chain links 75, and this hook 74 is hooked into a suitable link of the chain 56, after which a link of the said brought-backward end portion 56a of the chain may be engaged over the hook 71 on bar 70 while the latter is in its dotted line position of Fig. 1. As the leverage bar 70 is forced to its full line position in Fig. 1, the chain 56 is drawn more tightly around the load and the hooked end portion of 56a of the chain is carried over-center with respect to the pivot 72 whereby the tension of the chain tends to maintain leverage bar 70 in its full line position of Fig. 1. Actually, the chain 56 is loose enough to permit relative movements of the bound together blocks during the dumping process, as hereinafter described.

The angle iron frame 58 has a generally V-shaped member 76 secured thereto at each side of the frame, by means of which the frame may be drawn and held against the rear end of the load of blocks when the hook ends 78, 80 of two cables 82, 84 are connected, one to each V-shaped member 76. The cables lead from a power winch 86 mounted below one forward side of the truck body 10. Cable 82 extends upwardly from the winch over the pulleys 88, 90 whence it extends directly rearwardly to its hook connection at 78 to one of the V-shaped members 76. Cable 84 extends upwardly from the winch over the pulleys 92, 94 and thence transversely to the opposite side of the truck body and around pulleys 96, 98 whence it extends rearwardly to its hook connection to the other V-shaped member 76. The winch 86 may be of conventional type having locking means for preventing let-out of the cables which may be released for controlled let-out of the cables when a load is placed on the cables, with means for manual operation of the winch for take-in of the cables. The details of the winch are not illustrated or described beyond the showing of a chain 87 which hangs down when the truck body is hoisted for manual release of one of two brakes on the winch. A pull on the chain 87 releases the cables 82, 84, after which the second brake may be controlled by a long lever (not shown) by which a man may gradually lower the load along the inclined body and tail-board.

It should be noted that a truck load of building blocks as herein represented may weigh several times more than the entire truck or the portion thereof forward of the rear axle. Heretofore, dump trucks capable of handling loads greater than the weight of the forward portion of the truck have required tandem rear wheels to avoid lifting the front end of the truck when the loaded body was tilted in the dumping process.

The truck as herein disclosed utilizes the tail-board 36 as an inclined strut-extension of the floor 34 of the truck body when dumping a stacked load of building blocks, or the like, and the tail-board coacts with the rear axle of the truck in maintaining the forward end of the truck on the ground and in supporting the load when the truck body is elevated to its dumping inclination.

Assuming that the loaded truck of Fig. 1 has arrived at its destination where the load of blocks is to be deposited on the ground with the blocks in substantially the stacked relation they have in the truck, the tail-board 36 will be lowered into substantial parallelism with the floor of the truck body and be locked by insertion of pins 45 in the registering holes 44a, 44b and 33a, 33b in the tail-board and in the angle or channel iron members 32 and their extensions 33. The body 10 now may be elevated or hoisted by operation of the hydraulic tilting or hoisting means of Figs. 3 and 7 until the tail-board engages the ground, at which time the inclined load will be distributed between the rear axle and the tail-board. The load in the truck body meanwhile is held by the cables 82, 84 and winch 86 against slipping until the locking means of the winch is tripped to permit controlled letting-out of the cables and gradual lowering of the load until the angle iron 100 at the lower edge of the frame 58 engages and digs into the ground as illustrated in Fig. 7. At this stage of the block-dumping process, the hooked ends of the cables 82, 84 may be detached from the V-shaped members 76, after which the truck body is moved forward until clear of the load of blocks. As the truck moves out from under the load, the dug-in angle iron 100 of frame 58 constitutes a pivot about which the load of blocks gradually lowers itself with the individual blocks in the separate tied-together stacks S slipping and moving relatively within chain 56 enough to permit the load to become lowered without substantial displacement of the blocks out of their stacked relationship. Actually the four rearmost stacks S settle flat on the ground but the two forward stacks S are held by chain 56 in an elevated position, as diagrammatically represented in Fig. 8. However, by operating lever 70 of the tensioning means 66 from its full line position to its dotted line position in Fig. 8, the chain quickly is loosened all around the load of blocks, and the blocks in the two foremost stacks S drop in a considerably loosened and disturbed stacked relationship as compared with the remainder of the load. Nevertheless, the entire load of blocks becomes deposited in space-saving stacked condition without danger of breakage or chipping of blocks. Also, the delivering of a load of blocks by my improved truck can be accomplished with substantial saving of time and labor, as compared with prior comparable trucks and prior block-delivering procedures. Perhaps equally important is the fact that the invention makes it possible for a truck to deliver a load of blocks and return with a load of cinders whereas the prior trucks designed to handle blocks have not been useable for ordinary trucking duties.

When the hooked ends of the cables 82, 84 are detached from the generally V-shaped members 76, they conveniently may be hooked to the tail-board 36 as shown in Fig. 3, each side portion 44 of the tail-board frame having a slot 102 therein (Figs. 2 and 6) for passage of a cable hook 78 or 80 into hooked engagement with a lug 104 which is fixed to the frame transversely of the adjacent slot 102. Because of the rugged and weighty nature of the tail-board 36, it is desirable to lift the tail-board to its body closing position by means of the power winch 86 and cables 82, 84. One man ordinarily cannot lift it, and it is a burdensome task for two men to lift it. After it has been drawn to its body closing position, the tail-board may be locked by any conventional releasable means, such as a bolt 106 (Fig. 1) at each side, inserted through a hole in a side-board flange 41 and through a registering hole in the tail-board frame, the inserted end of the bolt having a slot therethrough for reception of a key-pin 108.

As each cable hook 78, 80 is drawn downward to hooked engagement with a tail-board lug 104, the attached cable engages a pulley or roller 110 mounted on the rear top edge of each side-board 40. This ensures that a take-in pull of the cables will act on the tail-board in direction to effectively lift it about its pivot at 38.

Preferably, each cable 82, 84, at the forward end of the truck body, passes through a friction clamp, indicated generally at 112 in Fig. 4, which maintains a general tautness of the cables between the winch 86 and the guide pulleys 88, 90, 92, 94, 96 and 98.

It is intended that the patent shall cover, by suitable expression in the appended claims, whatever features of patentable novelty exist in the invention disclosed.

I claim as my invention:

1. In a vehicle of the dump-truck variety, a chassis having a rear axle with wheels thereon, a truck body pivotally mounted at a rear location on the chassis and having a floor, a tail-board pivotally mounted at the rear end of the truck body and movable about its pivot between a position in which it closes the rear end of the truck body and a position in which it extends substantially in the plane of said floor of the body, means for relatively loosely tying together a load of stacked block elements within the truck body, said tying means comprising a rigid frame for engaging the rearwardly facing end of the stack and a tie element extending around the stack and across said frame, with a quick-release tensioning means acting on said tie element, hoisting means operable between the truck body and chassis for tilting the body about its pivot to a dumping inclination, the outer edge of said tail-board, when the tail-board is in its said position in the plane of the floor of the truck body, moving into engagement with the ground when the body is tilted to a said dumping inclination, cable means extending from the forward end of the truck body and releasably connected to said frame at opposite sides thereof for holding the tied-together load of stacked block elements against slipping on the floor of the truck body during the process of hoisting the body to a said dumping inclination, and means for controlled let-out of the cable means for lowering the tied-together load of stacked block elements along the inclined floor of the body and the tail-board extension into engagement with the ground, said tail-board constituting a strut coacting with said rear axle and wheels in supporting the load in the inclined truck body and during its descent into engagement with the ground.

2. In a vehicle of the dump-truck variety, a chassis having a rear axle with wheels thereon, a truck body pivotally mounted at a rear location on the chassis and having a floor, a tail-board pivotally mounted at the rear end of the truck body and movable about its pivot between a position in which it closes the rear end of the truck body and a position in which it extends substantially in the plane of said floor of the body, means for relatively loosely tying together a load of stacked block elements within the truck body, said tying means comprising a rigid frame for engaging the rearwardly facing end of the stack and a tie element extending around the stack and across said frame, with a quick-release tensioning means acting on said tie element, hoisting means operable between the truck body and chassis for tilting the body about its pivot to a dumping inclination, the outer edge of said tail-board, when the tail-board is in its said position in the plane of the floor of the truck body, moving into engagement with the ground when the body is tilted to a said dumping inclination, cable means extending from the forward end of the truck body and releasably connected to said frame at opposite sides thereof for holding the tied-together load of stacked block elements against slipping on the floor of the truck body during the process of hoisting the body to a said dumping inclination, means for controlled let-out of said cable means for lowering the tied-together load of stacked block elements along the inclined floor of the truck body and the tail-board extension into engagement with the ground, said frame having means at its lower transverse edge for digging into the ground and constituting pivot means about which the tied-together load of stacked block elements settles to the ground when the truck is moved forward out from under the load, said block elements being relatively movable within said tie element but being maintained substantially in their stacked condition during said settling, and said quick-release tensioning means being operable to release the tie element for removal from the settled stack of block elements.

References Cited in the file of this patent

UNITED STATES PATENTS

| Number | Name | Date |
|---|---|---|
| 446,308 | Welch | Feb. 10, 1891 |
| 905,121 | Wortman | Nov. 24, 1908 |
| 1,014,734 | Witten | Jan. 16, 1912 |
| 1,455,821 | Swanson | May 22, 1923 |
| 1,573,121 | Potter | Feb. 16, 1926 |
| 1,883,473 | Barrett | Oct. 18, 1932 |
| 2,344,755 | Venard | Mar. 21, 1944 |

FOREIGN PATENTS

| Number | Country | Date |
|---|---|---|
| 63,117 | Germany | July 13, 1892 |
| 401,813 | Great Britain | Nov. 23, 1933 |